United States Patent
Herrmann et al.

(10) Patent No.: US 6,877,357 B2
(45) Date of Patent: Apr. 12, 2005

(54) METHOD OF CHECKING THE FUNCTIONAL RELIABILITY OF A PRESSURE SENSOR

(75) Inventors: Thomas Herrmann, Oehringen (DE); Knut Balzer, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/477,870

(22) PCT Filed: Sep. 24, 2002

(86) PCT No.: PCT/DE02/03605
§ 371 (c)(1),
(2), (4) Date: Nov. 12, 2003

(87) PCT Pub. No.: WO03/078954
PCT Pub. Date: Sep. 25, 2003

(65) Prior Publication Data
US 2004/0134256 A1 Jul. 15, 2004

(30) Foreign Application Priority Data
Mar. 13, 2002 (DE) .................. 102 10 925

(51) Int. Cl.⁷ .......................... G01L 27/00
(52) U.S. Cl. ..................... 73/1.71; 73/1.59
(58) Field of Search ............... 73/1.71, 1.59; 702/116, 138; 340/436

(56) References Cited

U.S. PATENT DOCUMENTS

| | | | | |
|---|---|---|---|---|
| 3,875,434 A | * | 4/1975 | Harden et al. ............ 327/516 |
| 4,653,280 A | | 3/1987 | Hansen et al. | |
| 5,482,314 A | * | 1/1996 | Corrado et al. ............ 280/735 |
| 5,748,075 A | * | 5/1998 | Dirmeyer et al. ............ 340/436 |
| 5,974,892 A | * | 11/1999 | Swart et al. ............ 73/714 |
| 6,434,456 B1 | * | 8/2002 | Babala et al. ............ 701/34 |
| 6,634,221 B2 | * | 10/2003 | Harris et al. ............ 73/121 |
| 6,678,593 B2 | * | 1/2004 | Kachel et al. ............ 701/34 |
| 6,684,151 B1 | * | 1/2004 | Ring ............ 701/110 |
| 6,691,556 B2 | * | 2/2004 | Wheeler et al. ............ 73/40.5 R |
| 6,732,566 B2 | * | 5/2004 | Roelleke et al. ............ 73/12.08 |
| 2004/0015282 A1 | * | 1/2004 | Babala et al. ............ 701/70 |

FOREIGN PATENT DOCUMENTS

| | | | |
|---|---|---|---|
| DE | 196 08 180 | 2/1997 | |
| DE | 19608180 C1 | * 2/1997 | .......... B60R/21/32 |
| EP | 0 393 730 | 10/1990 | |
| JP | 05 102088 | 4/1993 | |

OTHER PUBLICATIONS

Patent Abstracts of Japan, vol. 017, No. 450 (E–1416), Aug. 18, 1993.

* cited by examiner

*Primary Examiner*—Hezron Williams
*Assistant Examiner*—John Fitzgerald
(74) *Attorney, Agent, or Firm*—Kenyon & Kenyon

(57) ABSTRACT

A method of checking the functional reliability of a pressure sensor, the air pressure being detected inside a vehicle body part, the vehicle having at least one additional pressure sensor for detecting the air pressure. With the help of the method, it may be possible to determine the integrity of the sensor without requiring any additional auxiliary equipment. To do so, the measured values of the pressure sensor and the measured values of the at least one additional pressure sensor are compared over a defined observation period. The pressure sensor is recognized as being defective if its measured values deviate by more than a predefined amount from the measured values of the at least one additional pressure sensor.

12 Claims, 1 Drawing Sheet

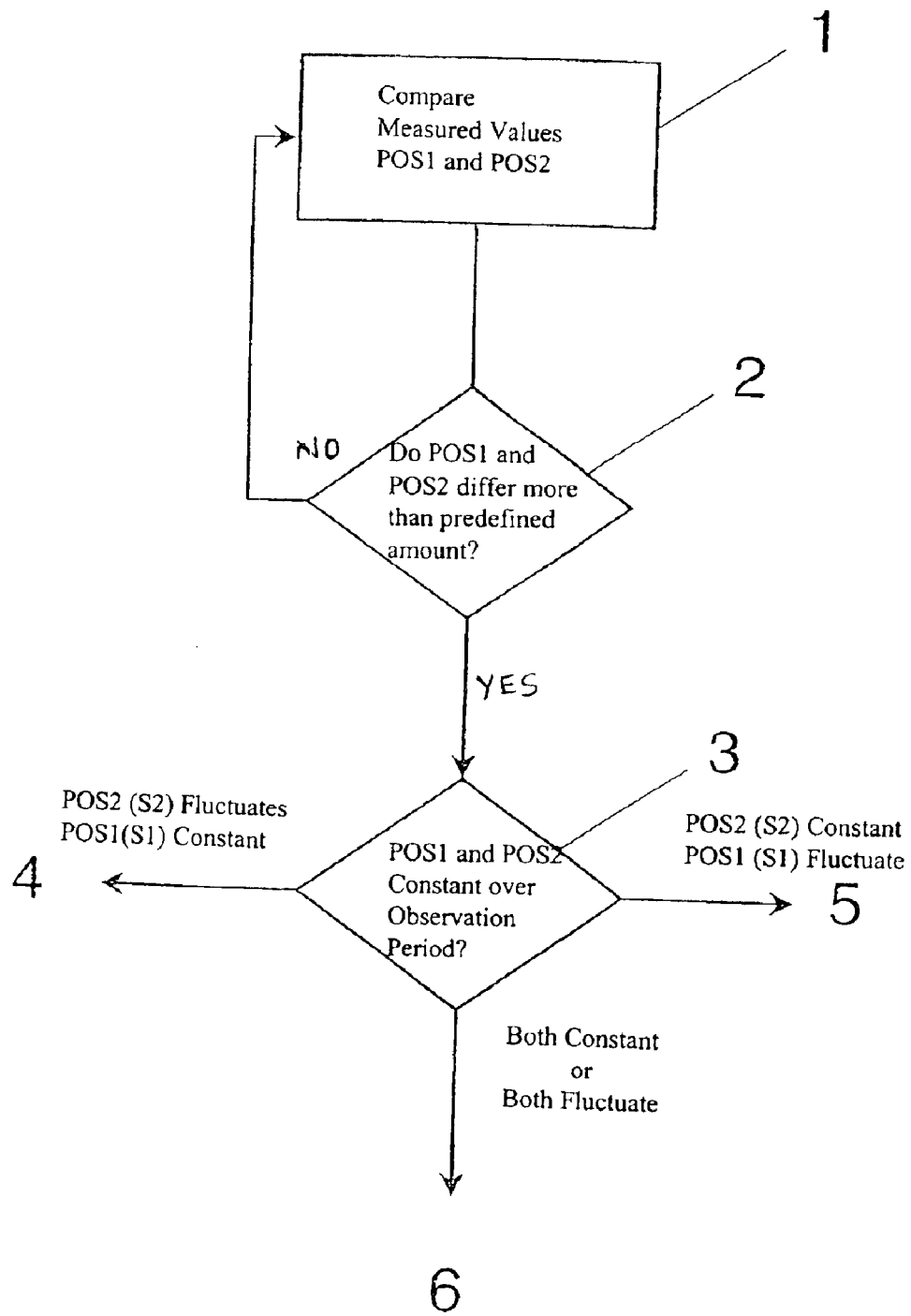
Fig.

METHOD OF CHECKING THE FUNCTIONAL RELIABILITY OF A PRESSURE SENSOR

FIELD OF THE INVENTION

The present invention relates to a method of checking the functional reliability of a pressure sensor which detects the air pressure inside a vehicle body part, the vehicle having at least one additional pressure sensor for detecting the air pressure.

BACKGROUND INFORMATION

Pressure sensors, in particular micromechanical pressure sensors, are used in the area of passenger protection, among other things, in automotive engineering. For example, pressure sensing is often performed on the sides of a vehicle in addition to acceleration sensing in y direction to detect a side impact and to decide whether restraint means are to be deployed. To this end, pressure sensors are located in the vehicle doors; in the steady state, i.e., in the normal state, they detect ambient air pressure p0. This pressure depends on the weather and on the specific elevation above sea level. A side impact which deforms the door of the vehicle is associated with a rapid increase in pressure $\Delta p = p1 - p0$, which depends on the impact intensity.

As mentioned above, pressure sensors having micromechanical sensor elements are frequently used in practice. Generally, the membrane of such a sensor is diagnosed as being defective only when it is completely destroyed. Minor damage, e.g., scratches on the surface or tears in the membrane, is currently detectable only with additional auxiliary equipment.

SUMMARY

In accordance with an example method of the present invention, the functional reliability of a pressure sensor may be checked, and it may be possible to deduce the integrity of the sensor without requiring additional auxiliary equipment. Thus, with the help of the example method according to the present invention, it may be possible to improve the self-diagnosis efficiency of a passenger protection system without any extra cost.

This may be achieved according to the present invention, for example, by comparing the measured values of the pressure sensor and the measured values of the at least one additional pressure sensor over a defined observation period; the pressure sensor is recognized as being defective if its measured values deviate by more than a predefined amount from the measured values of the at least one additional pressure sensor.

The example embodiment of the present invention makes use of the fact that a plurality of pressure sensors is usually installed in a motor vehicle to detect the ambient air pressure. Thus, for example, the passenger protection system for a side impact described above already includes at least two or four pressure sensors, depending on the number of vehicle doors, these sensors being located in the vehicle doors and detecting the ambient air pressure in the normal state. Additional pressure sensors may be provided, e.g., for the engine management, for the air conditioning in the interior of the vehicle and/or for an automotive weather station. This redundancy in air pressure detection may be utilized according to the present invention to determine the integrity, i.e., the functional reliability, of one or all of the sensors involved in a comparison of measured values. The measured values of a plurality of pressure sensors are compared over a defined observation period, and a pressure sensor is recognized as being defective only if its measured values deviate by more than a predefined amount from the measured values of the other pressure sensors involved in the measured value comparison. Therefore, singular events such as a side impact will have no effect on the function test according to the present invention, which is performed continuously, more or less in the background.

To perform the example method according to the present invention, at least one additional pressure sensor is used, its measured values being compared with those of the pressure sensor to be checked. However, it should be pointed out again explicitly here that all the pressure sensors involved in the measured value comparison are equivalent with regard to checking their functional reliability, i.e., all the pressure sensors involved may be checked as part of the measured value comparison, and at the same time all the involved pressure sensors may be used as reference sensors. Accordingly, detection of a defect in a sensor is more reliable, the greater the number of pressure sensors involved in the measured value comparison and thus the greater the redundancy in determination of the air pressure. As already explained above, the individual pressure sensors involved in the measured value comparison may be assigned to one system, e.g., passenger protection, or to completely different systems.

The method according to the present invention may be used in an advantageous manner for checking the functional reliability of a pressure sensor, which is used to recognize a side impact and is therefore situated in the corresponding vehicle door. In an advantageous manner, the measured value comparison is performed here with a pressure sensor which is also used to detect a side impact and therefore is also situated in a vehicle door. Placing the two comparative sensors within vehicle body parts offers good protection against mechanical interference in any case.

In an advantageous refinement of the example method according to the present invention for checking the functional reliability of a pressure sensor, which is used for detecting vehicle collisions, the decision regarding deployment of restraint means is made independently of the measured values of the pressure sensor if the pressure sensor has been recognized as being defective. It is possible in this way to ensure at least a certain passenger protection.

It may be advantageous if the measured values of the pressure sensor whose functional reliability is checked with the help of the method according to the present invention are utilized multiple times, i.e., as part of multiple vehicle systems. Thus, the ambient air pressure, which is detected continuously as part of passenger protection, may also be displayed in the driving information system, for example. If necessary, information regarding ambient air pressure may also be used to optimize the air conditioning in the interior of the vehicle or to implement an automotive weather station.

There are various possibilities for embodying and refining the teaching of the present invention in an advantageous manner.

BRIEF DESCRIPTION OF THE DRAWING

The FIGURE shows a flow chart of an example method according to the present invention.

DESCRIPTION OF AN EXAMPLE EMBODIMENT

A motor vehicle is equipped with an acceleration sensing system in y direction and with one pressure sensor S1 and S2 on each side to detect a side impact. Pressure sensors S1 and S2 are situated in the vehicle doors, so that in the normal state they detect ambient air pressure p0. A side impact which deforms the particular door is associated with a rapid increase in pressure $\Delta p = p1-p0$ amounting to approx. 100 mbar within 3 ms, depending on intensity. Ambient air pressure p0 depends on the prevailing weather and the altitude above sea level.

At point 1 in the flow chart shown in the FIGURE, measured values pOS1 and pOS2 of the two pressure sensors S1 and S2—right/left sides of the vehicle—are compared over a defined observation period to determine the integrity of particular sensors S1 and S2. To do so, measured values pOS1 and pOS2 may be compared every 250 ms, for example. A check is performed at point 2 to determine whether measured values pOS1 and pOS2 determined during the observation period differ by a predefined amount. If this is not the case, then the comparison performed at point 1 is performed for the next observation period. If measured values pOS1 and pOS2 of the two pressure sensors S1 and S2 differ by more than the predefined amount, then it may be assumed that the functional reliability of at least one of the two pressure sensors has been disturbed.

The identity of the defective sensor element may be deduced from the changes in ambient air pressure within the observation period. To do so, a check is performed at point 3 to determine whether measured values pOS1 and/or pOS2 have remained constant within the observation period. For example, if the measured values of pressure sensor S2 have been subject to normal fluctuations, e.g., due to weather, while the measured values of pressure sensor S1 have remained constant, then it may be assumed that the functional reliability of pressure sensor S1 is disturbed. In this case, at least a corresponding warning may be output at point 4, or at point 5 if the relationships have been inverted and therefore pressure sensor S2 is disturbed. In addition, minimal impact protection may also be maintained for the side in question by activating the restraint means here on the basis of only the acceleration sensing in y direction without taking into account the pressure sensing. If the measured values of the two pressure sensors have remained constant during the observation period or if the two measured values have been subject to different fluctuations, then no concrete statements may be made regarding the functional reliability of individual pressure sensors S1 and S2. In this case, additional checking measures must be implemented at point 6.

What is claimed is:

1. A method of checking functional reliability of a pressure sensor which detects air pressure inside a vehicle body part, the vehicle having at least one additional pressure sensor for detecting the air pressure, comprising:

comparing measured values of the pressure sensor and measured values of the at least one additional pressure sensor over a defined observation period; and recognizing the pressure sensor as being defective if the measured values of the pressure sensor deviate by more than a predefined amount from the measured values of the at least one additional pressure sensor;

wherein the pressure sensor is configured to detect a vehicle collision, the vehicle collision being a side impact, and wherein a decision regarding deployment of a restraint arrangement is made independently of the measured values of the pressure sensor if the pressure sensor has been recognized as being defective.

2. The method as recited in claim 1, further comprising:
situating the additional pressure sensor in a vehicle body part different from the vehicle body part in which the pressure sensor is provided.

3. The method as recited in claim 1, wherein the measured values of the pressure sensor are utilized multiple times, as part of one of passenger protection, air conditioning in an interior of the vehicle and an automotive weather station.

4. The method as recited in claim 1, further comprising:
displaying the measured values of the pressure sensor via a driver information system.

5. The method as recited in claim 1, further comprising:
situating the additional pressure sensor in a vehicle body part different from the vehicle body part in which the pressure sensor is provided, and situating the pressure sensor in a vehicle door and configuring the pressure sensor to detect a side impact.

6. The method as recited in claim 5, wherein the measured values of the pressure sensor are utilized multiple times, as part of one of passenger protection, air conditioning in an interior of the vehicle and an automotive weather station.

7. The method as recited in claim 5, further comprising:
displaying the measured values of the pressure sensor via a driver information system.

8. The method as recited in claim 1, further comprising:
situating the additional pressure sensor in a vehicle door on a same side of the vehicle as the pressure sensor or on another side of the vehicle as the pressure sensor;
situating the pressure sensor in a vehicle door and configuring the pressure sensor to detect a side impact; and
displaying the measured values of the pressure sensor via a driver information system.

9. The method as recited in claim 8, wherein the measured values of the pressure sensor are utilized multiple times, as part of one of passenger protection, air conditioning in an interior of the vehicle and an automotive weather station.

10. The method as recited in claim 8, further comprising:
displaying the measured values of the pressure sensor via a driver information system.

11. The method as recited in claim 1, further comprising:
situating the pressure sensor in a vehicle door and configuring the pressure sensor to detect a side impact.

12. The method as recited in claim 11, further comprising:
situating the additional pressure sensor in a vehicle door on a same side of the vehicle as the pressure sensor or on another side of the vehicle as the pressure sensor.

* * * * *